W. KINGSBURY.
COFFEE OR TEA CONTAINER.
APPLICATION FILED MAY 8, 1908.
916,327.
Patented Mar. 23, 1909.
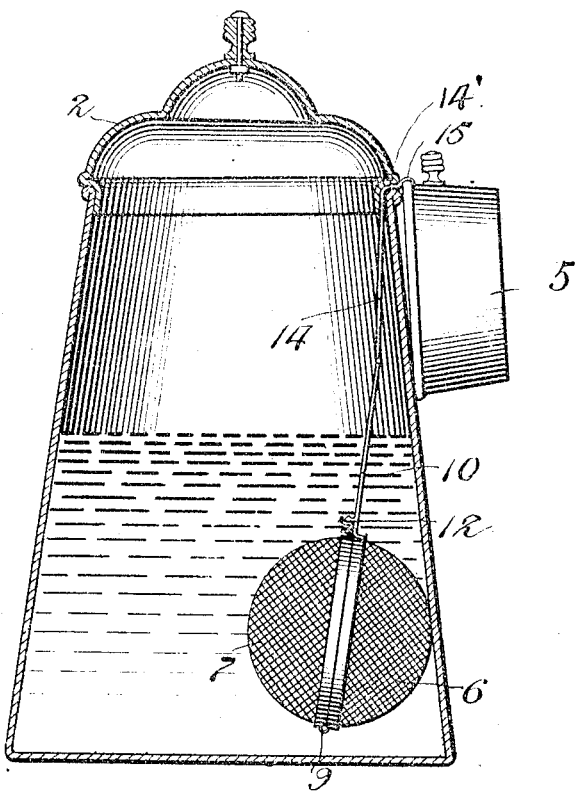
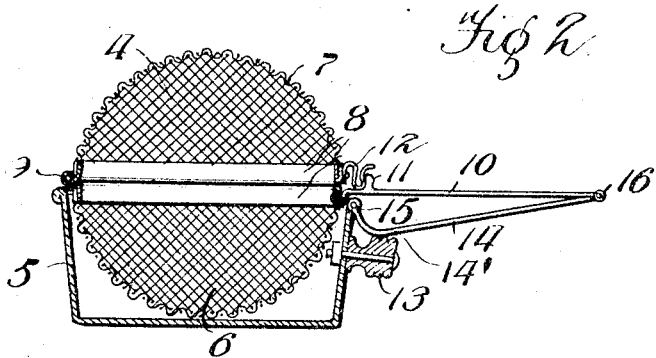
Witnesses
Hugh H. Ott
Inventor
William Kingsbury
By Victor J. Evans
Attorney

UNITED STATES PATENT OFFICE.

WILLIAM KINGSBURY, OF ELKSTON, ALBERTA, CANADA.

COFFEE OR TEA CONTAINER.

No. 916,327.

Specification of Letters Patent.

Patented March 23, 1909.

Application filed May 8, 1908. Serial No. 431,610.

*To all whom it may concern:*

Be it known that I, WILLIAM KINGSBURY, a subject of the King of Great Britain, residing at Elkston, Alta, in the Dominion of Canada, have invented new and useful Improvements in Coffee or Tea Containers, of which the following is a specification.

This invention relates to a coffee or tea container, and the object of the invention is to provide a reticulated container adapted for the reception of coffee or tea, said container being provided with an arm having pivoted connection with a similar arm pivotally connected with a cup, whereby the container may be deposited within the coffee or tea pot and retained suspended therein by the pivoted cup engaging the outer side of the pot.

Another object of the invention is to provide a device of this character adapted for extracting the essence from coffee or tea grounds, comprising a reticulated container composed of two hemi-spherical members hingedly connected together and being provided with an arm, and a cup provided with a pivoted arm having connection with the arm of the container, whereby the arm of the container may be swung upon the arm of the cup and the reticulated container deposited within the cup so that the drippings from the wet coffee or tea grounds within the container may be drained within the cup, and whereby the device may be folded into small compass.

With these and other objects in view the invention resides in the novel construction of elements and their arrangement in operative combination hereinafter fully described and claimed.

In the accompanying drawings, Figure 1 is a longitudinal sectional view of the coffee or tea brewing pot provided with the improvement. Fig. 2 is a longitudinal sectional view of the device in folded position.

In the accompanying drawings the numeral 1 represents an ordinary coffee or tea brewing receptacle provided with an ordinary cover or closure 2.

The numeral 3 designates the improved coffee or tea container. This device 3 comprises a reticulated containing member 4 and a cup member 5. The containing member 4 is constructed of two substantially hemi-spherical members 6 and 7, each of which have their ends provided with a metallic band 8 and are pivotally connected together as indicated by the numeral 9. The band 8 of the section 6 is provided with an outstanding arm 10, having a lug 11, adapted to be engaged by a spring catch 12, provided upon the band 8 of the section 7. The cup 5 is provided with a knob or handle 13, and is also provided with an arm 14 having an offset 14' and pivotally connected with the cup at 15. The arms 10 and 14 are of an approximately equal length and have their free ends provided with perforated ears adapted for the reception of a suitable pintle 16, by which they are hingedly connected together.

In brewing coffee or tea with the improved device, the section 7 of the container 4 is opened upon the section 6, the grounds deposited within the receptacle, the receptacle closed and locked by the spring catch 12, the cup 5 swung away from the container, and the container deposited within the coffee or tea receptacle 1. The offset portion 14' of the arm 14 engaging the rim of the mouth of the pot, and the cup swung against the side of the pot, as illustrated in Fig. 1 of the drawings. When sufficient essence is extracted from the grounds within the reticulated container in the process of brewing, the cover 2 is removed from the pot 1 and the container withdrawn from the pot, and folded, as illustrated in Fig. 2, so as to deposit the container within the cup 4, thus allowing the drainage from the wet grounds to be deposited within the cup 5, and the arms 10 and 14 will serve as an effective handle whereby the device may be moved to any desired place.

Having thus fully described the invention what is claimed as new is:

1. A device for extracting essence from coffee or tea, comprising a reticulated container; an arm upon the container, and a cup provided with a pivoted arm connected with the arm of the container, whereby the arm of the container may be swung upon the arm of the cup and the container deposited within the cup.

2. A device of the character described comprising a reticulated container, constructed of a pair of hemi-spherical members hingedly connected together, an arm upon one of the members provided with a lug, a spring catch upon the other member adapted to engage with the lug, and a cup member provided with a pivoted arm having an offset and hingedly connected with the arm of the container.

3. A device for the purpose set forth comprising a container member and a cup member, the retainer being constructed in two sections of hemi-spherical gauze and having their rims provided with bands and hingedly secured together, an arm upon one of the sections provided with a lug, a spring catch upon the opposite member engaging the lug, the cup member having a knob and being provided with a pivoted arm having an offset, the arms of the container and the cup being pivoted together, and the arms being adapted to be swung upon each other to deposit the container within the cup, and to cause the offset of the arm of the cup to rest upon the knob of the cup.

In testimony whereof I affix my signature in presence of two witnesses.

WILLIAM KINGSBURY.

Witnesses:
  LOUIES TEYNOR,
  ROBERT BROWN